United States Patent
Kato

(10) Patent No.: US 9,894,221 B2
(45) Date of Patent: Feb. 13, 2018

(54) INFORMATION PROCESSING SYSTEM, INFORMATION PROCESSING APPARATUS, DEVICE, INFORMATION PROCESSING METHOD AND COMPUTER PROGRAM PRODUCT. CONFIGURED FOR PROCESSING OF TRANSMISSION AT TIME SPECIFIED IN TRANSMISSION SETTING INFORMATION

(71) Applicant: Kaori Kato, Tokyo (JP)

(72) Inventor: Kaori Kato, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/049,362

(22) Filed: Feb. 22, 2016

(65) Prior Publication Data

US 2016/0255214 A1    Sep. 1, 2016

(30) Foreign Application Priority Data

Feb. 26, 2015    (JP) .................................. 2015-036251

(51) Int. Cl.
*G06F 3/12*    (2006.01)
*H04N 1/00*    (2006.01)

(52) U.S. Cl.
CPC ..... *H04N 1/00204* (2013.01); *H04N 1/00644* (2013.01); *H04N 1/00938* (2013.01); *H04N 2201/0094* (2013.01)

(58) Field of Classification Search
CPC ........ G06F 3/1205; G06F 3/1255; G06F 1/30; G06F 3/1204; G06F 3/127; G06F 3/1231; B41J 15/044; H04N 1/00517; H04N 1/00917; H04N 1/00087; H04N 1/00779; G09G 2320/08

See application file for complete search history.

(56) References Cited

U.S. PATENT DOCUMENTS

| | | | | |
|---|---|---|---|---|
| 2006/0279774 A1* | 12/2006 | Matsuoka | ........... | H04L 12/2803 358/1.15 |
| 2008/0120379 A1 | 5/2008 | Yokoyama et al. | | |
| 2008/0120394 A1* | 5/2008 | Yokoyama | .............. | H04L 67/02 709/217 |
| 2013/0094046 A1* | 4/2013 | Naito | ................. | G03G 15/5083 358/1.14 |
| 2014/0204407 A1* | 7/2014 | Tokumaru | .......... | H04N 1/00891 358/1.14 |

FOREIGN PATENT DOCUMENTS

| | | |
|---|---|---|
| JP | H08-123876 | 5/1996 |
| JP | 2006-344074 | 12/2006 |
| JP | 2008-097531 | 4/2008 |
| JP | 2014-116825 | 6/2014 |

* cited by examiner

*Primary Examiner* — Henok A Shiferaw
(74) *Attorney, Agent, or Firm* — Cooper & Dunham LLP

(57) ABSTRACT

An information processing system includes an information processing apparatus; and a device coupled to the information processing apparatus via a network. The device includes a reception unit configured to receive, from the information processing apparatus, a piece of setting information on transmission of a piece of information stored in the device; and a first transmission unit configured to transmit the piece of information stored in the device, at a transmission time specified in the piece of setting information received by the reception unit, to a transmission destination specified in the piece of setting information.

14 Claims, 9 Drawing Sheets

| SETTING ITEM | VALUE (EXAMPLE) |
|---|---|
| TRANSMISSION DESTINATION | aaa@bbb.ccc |
| TRANSMISSION TIME | AT 15:00 EVERY DAY |
| TRANSMISSION RETRY | ON |
| TRANSMISSION OBJECT | ....... |

INFORMATION PROCESSING SYSTEM, INFORMATION PROCESSING APPARATUS, DEVICE, INFORMATION PROCESSING METHOD AND COMPUTER PROGRAM PRODUCT, CONFIGURED FOR PROCESSING OF TRANSMISSION AT TIME SPECIFIED IN TRANSMISSION SETTING INFORMATION

CROSS-REFERENCE TO RELATED APPLICATIONS

The present application claims benefit of priority under 35 U.S.C. §119 of Japanese Patent Application No. 2015-036251, filed Feb. 26, 2015. The contents of this application are incorporated herein by reference in their entirety.

BACKGROUND OF THE INVENTION

1. Field of the Invention

The disclosures herein generally relate to an information processing system, an information processing apparatus, a device, an information processing method and a computer program product for being executed on a computer.

2. Description of the Related Art

Examples of information managed by a device such as an image forming apparatus include counter information. For example, in a case of the image forming apparatus, the counter information includes a cumulative number of printed sheets, a cumulative number of scanned sheets, a cumulative number of copied sheets or the like.

The counter information is important as information for perceiving a status of utilization of the device. For example, it is possible to grasp charging in accordance with utilization of the device or influence on the environment due to the utilization of the device. Moreover, it is also possible to grasp whether a status of utilization of the device by each user follows a rule defined in an organization (for example, promotion of utilization of double side printing or collective printing from a viewpoint of resource saving or cost reduction, reduction of utilization of color printing, or the like), based on the counter information.

SUMMARY OF THE INVENTION

It is a general object of at least one embodiment of the present invention to provide an information processing system, an information processing apparatus, a device, an information processing method and a computer program product that substantially obviate one or more problems caused by the limitations and disadvantages of the related art.

In one embodiment, an information processing system includes an information processing apparatus; and a device coupled to the information processing apparatus via a network. The device includes a reception unit configured to receive, from the information processing apparatus, a piece of setting information on transmission of a piece of information stored in the device; and a first transmission unit configured to transmit the piece of information stored in the device, at a transmission time specified in the piece of setting information received by the reception unit, to a transmission destination specified in the piece of setting information.

In another embodiment, an information processing method is performed in a device and an information processing apparatus, which are coupled to each other via a network. The method includes receiving, in the device, from the information processing apparatus, a piece of setting information on transmission of a piece of information stored in the device; and transmitting, in the device, the piece of information stored in the device, at a transmission time specified in the piece of setting information received from the information processing apparatus, to a transmission destination specified in the piece of setting information.

In yet another embodiment, a computer program product is able to be executed on computers of a device and an information processing apparatus coupled to each other via a network. The program includes receiving, in the device, from the information processing apparatus, a piece of setting information on transmission of a piece of information stored in the device; and transmitting, in the device, the piece of information stored in the device, at a transmission time specified in the piece of setting information received from the information processing apparatus, to a transmission destination specified in the piece of setting information.

BRIEF DESCRIPTION OF THE DRAWINGS

Other objects and further features of embodiments will become apparent from the following detailed description when read in conjunction with the accompanying drawings, in which.

DESCRIPTION OF THE PREFERRED EMBODIMENTS

First Embodiment

Figure 1:
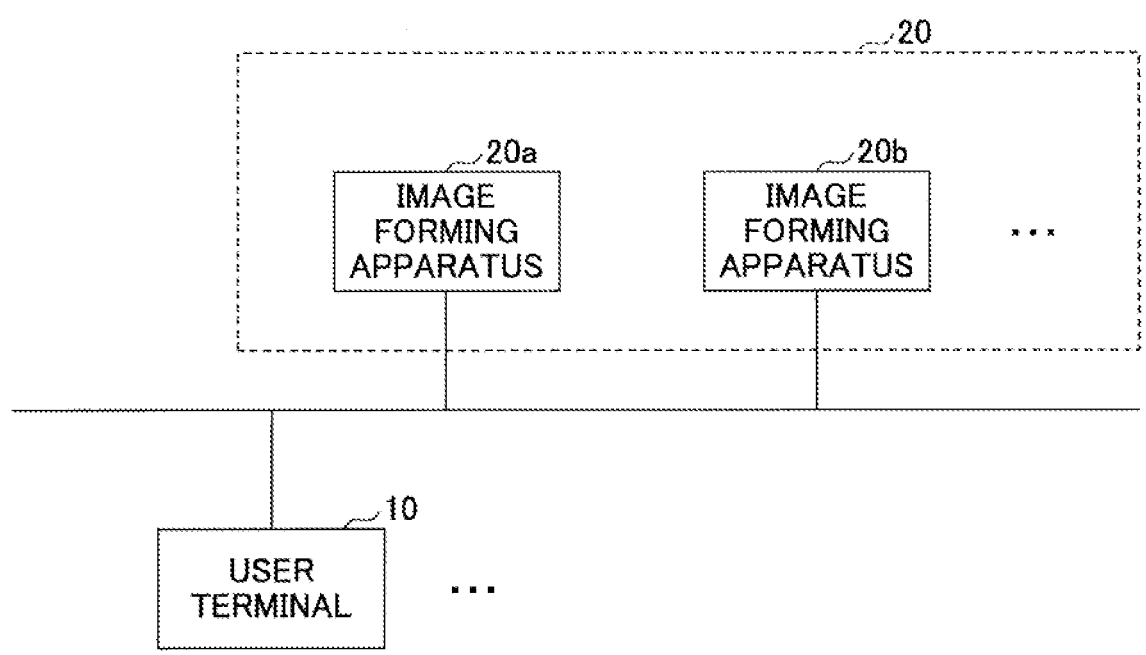
FIG. 1 is a diagram illustrating an example of a system configuration according to a first embodiment.

In the following, embodiments of the present invention will be described with reference to the accompanying drawings. FIG. 1 is a diagram illustrating an example of a system configuration according to the present embodiment. In FIG. 1, one or more image forming apparatuses 20 including an image forming apparatus 20a, an image forming apparatus 20b, and the like, and one or more user terminals 10 are coupled to each other for a communications connection via a network, such as a LAN (Local Area Network), the Internet or the like (whether it is wired or wireless is not considered).

The image forming apparatus 20 is a multifunction peripheral which enables two or more functions of printing, scanning, copying, sending/receiving facsimile and the like in a single chassis. However, a device having any one of the functions in a single body may be used as the image forming apparatus 20.

The user terminal 10 is used for inputting setting information (in the following, referred to as "transmission setting") regarding transmission or distribution of information (in the following, referred to as "device information"), a value of which can be different for each image forming apparatus 20, stored in the image forming apparatus 20. For example, as the user terminal 10, a personal computer (PC), a mobile phone, a smartphone, a tablet type terminal, a personal digital assistant (PDA) or the like may be used.

The transmission setting is information indicating a transmission destination of device information, transmission time (transmission timing), device information that is a transmission object or the like. The device information that is a transmission object includes, for example, counter information. The counter information changes its value in response to operation of the device (in response to execution of a job). For example, the counter information may include a number of sheets for each combination of color/monochrome and a function, such as printing, copying, facsimile, scanning or the like. Moreover, the counter information may include a number of sheets of double-side printing, a number of sheets of collective printing or the like. Moreover, the device information may include, other than the counter information, information indicating a state of the image forming apparatus 20, a parameter for each image forming apparatus 20, attribution information of the image forming apparatus 20 or the like.

Figure 2:
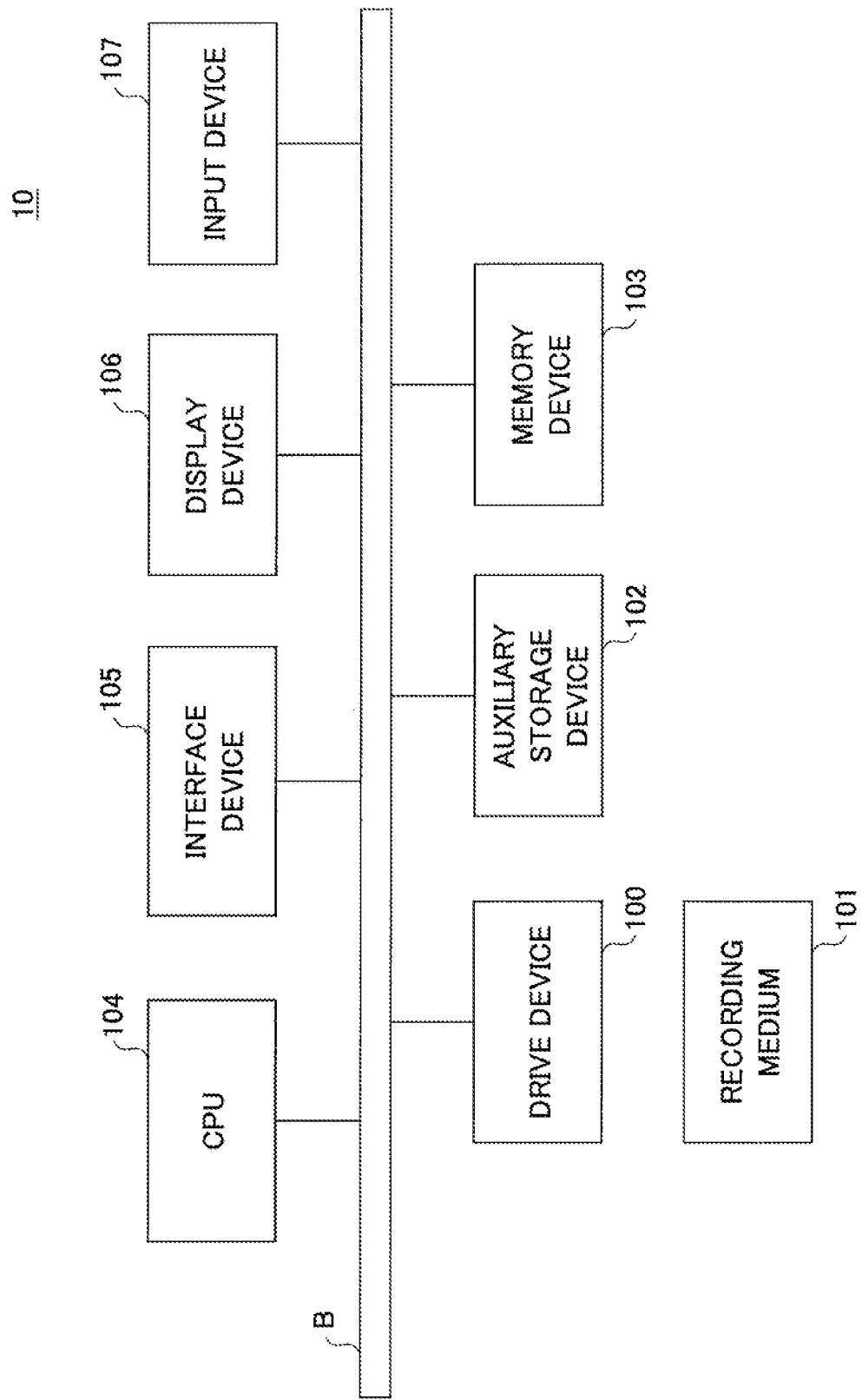
FIG. 2 is a diagram illustrating an example of a hardware configuration of a user terminal according to the first embodiment.

FIG. 2 is a diagram illustrating an example of a hardware configuration of the user terminal according to the first embodiment. The user terminal 10, shown in FIG. 2, includes a drive device 100, an auxiliary storage device 102, a memory device 103, a CPU (central processing unit) 104, an interface device 105, a display device 106, an input device 107 and the like, which are coupled to each other via a bus B.

A program that enables processing in the user terminal 10 is provided by a recording medium 101, such as a CD-ROM (compact disc read only memory). In a case where the recording medium 101 storing the program is set in the drive device 100, the program is installed in the auxiliary storage device 102 from the recording medium 101 via the drive device 100. However, the program is not necessarily installed from the recording medium 101, but may be downloaded from another computer via the network. The auxiliary storage device 102 stores necessary files, data or the like together with storing the program which is installed.

The memory device 103 reads out a program from the auxiliary storage device 102 and stores it, in a case where an activation instruction of the program is issued. The CPU 104 enables a function regarding the user terminal 10 according to the program stored in the memory device 103. The interface device 105 is used as an interface for coupling to the network. The display device 106 displays a Graphical User Interface (GUI) or the like by a program. The input device 107 includes a keyboard, a mouse and the like, and used for inputting various operation instructions.

Figure 3:
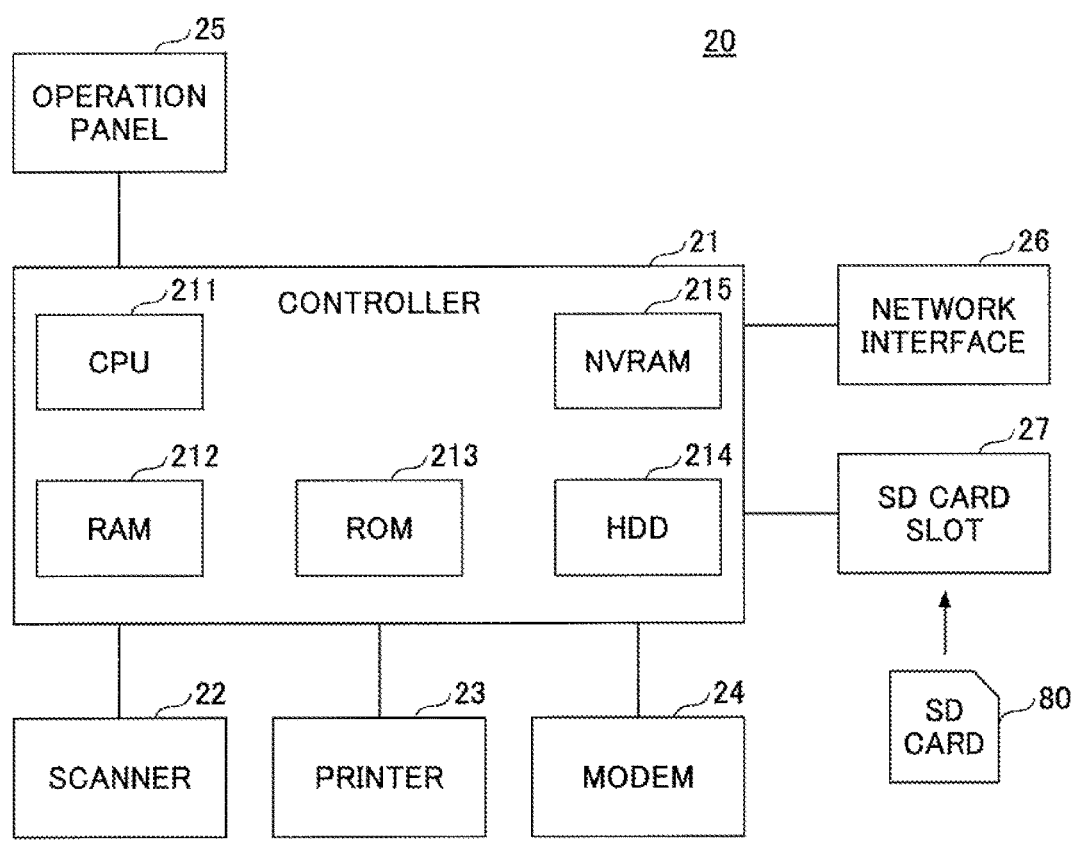
FIG. 3 is a diagram illustrating an example of a hardware configuration of an image forming apparatus according to the first embodiment.

FIG. 3 is a diagram illustrating an example of a hardware configuration of an image forming apparatus according to the first embodiment. In FIG. 3, the image forming apparatus 20 includes hardware, such as a controller 21, a scanner 22, a printer 23, a modem 24, an operation panel 25, a network interface 26 and an SD card slot 27.

The controller 21 includes a CPU 211, a RAM (random access memory) 212, a ROM (read-only memory) 213, a HDD (hard disk drive) 214, an NVRAM 215 and the like. The ROM 213 stores various programs, data used by the program or the like. The RAM 212 is used as a storage area for loading a program, a work area of the loaded program or the like. The CPU 211 enables various functions by executing the program loaded on the RAM 212. The HDD 214 stores a program, various data used by the program or the like. The NVRAM 215 stores various setting information or the like.

The scanner 22 is hardware for reading image data from a document (image reading means). The printer 23 is hardware for printing print data on a printing paper (printing means). The modem 24 is hardware for coupling to a telephone line, and is used for performing transmission/reception of image data by a facsimile communication. The operation panel 25 is hardware provided with an input means such as buttons for accepting an input from a user, a display means such as a liquid crystal panel or the like. The liquid crystal panel may have a touch panel function. In this case, the liquid crystal panel also doubles to perform a function of the input means. The network interface 26 is hardware for coupling to the network (whether it is wired or wireless is not considered), such as a LAN. The SD card slot 27 is used for reading out a program stored in an SD card 80. That is, in the image forming apparatus 20, not only a program stored in the ROM 213 but also a program stored in the SD card 80 can be loaded on the RAM 212 and executed. Meanwhile, the SD card 80 may be replaced by another recording medium (e.g. a CD-ROM, a USB (universal serial bus) memory or the like). That is, a kind of a recording medium corresponding to a position of the SD card 80 is not limited to a predetermined one. In this case, the SD card slot only has to be replaced by hardware corresponding to the recording medium.

Meanwhile, the operation panel 25 may be a device having a CPU and OS (operating system) independent from the image forming apparatus 20, such as a dedicated or general purpose smartphone or a tablet type terminal. The OS may be the one generally used in a smartphone or a tablet type terminal, such as Android (trademark registered). In doing so, in the same way as a smartphone, a tablet type terminal or the like, it is possible to display an expressive screen and to provide the same operational feeling as a smartphone, a tablet type terminal or the like. However, the operational panel 25 may be enabled by another device.

Figure 4:
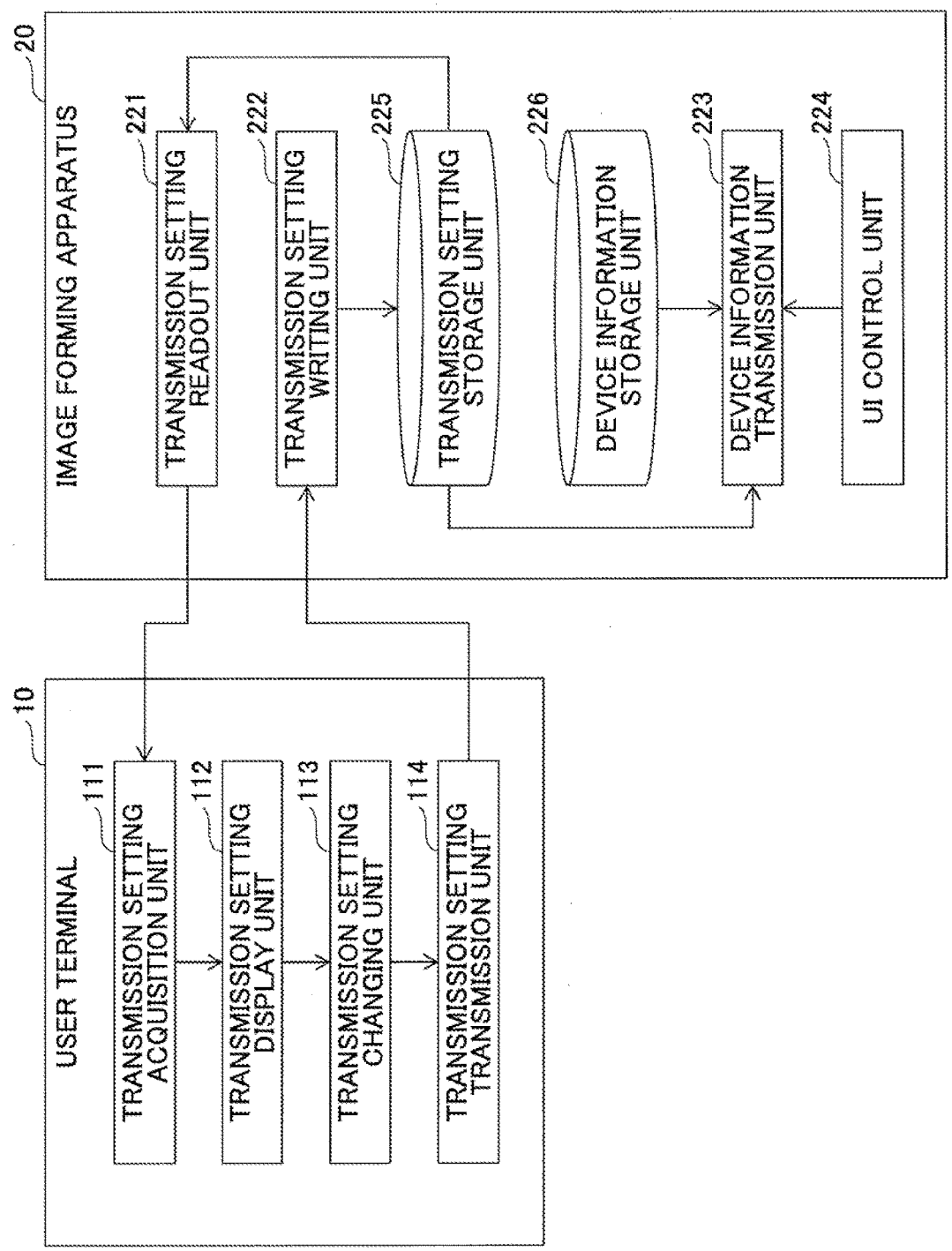
FIG. 4 is a diagram illustrating an example of a functional configuration of the user terminal and the image forming apparatus according to the first embodiment.

FIG. 4 is a diagram illustrating an example of a functional configuration of the user terminal and the image forming apparatus according to the first embodiment. In FIG. 4, the image forming apparatus 20 includes a transmission setting readout unit 221, a transmission setting writing unit 222, a device information transmission unit 223, a UI (user interface) control unit 224 and the like. The respective above-described units are enabled by processes that one or more programs installed in the image forming apparatus 20 cause the CPU 211 to execute. Moreover, the image forming apparatus 20 uses a transmission setting storage unit 225 and a device information storage unit 226. The respective above-described units are enabled by using the HDD 214, a storage device that can be coupled to the image forming apparatus 20 via the network, or the like.

The transmission setting readout unit 221 reads out a transmission setting stored in the transmission setting storage unit 225 in response to a request from the user terminal 10, and sends the transmission setting to the user terminal 10. The transmission setting writing unit 222 writes the transmission setting sent from the user terminal 10 into the transmission setting storage unit 225. The device information transmission unit 223 sends a piece of information, which is specified in the transmission setting stored in the transmission setting storage unit 225 among the pieces of device information stored in the device information storage unit 226, to a transmission destination specified in the transmission setting, at a transmission time specified in the transmission setting.

The UI control unit 224 displays a GUI (Graphical User Interface) for accepting a transmission instruction for device information on the operation panel 25 or the like, and requires the device information transmission unit 223 to send device information in response to an operation to the GUI. That is, device information can be sent not only at the transmission time specified in the transmission setting, but also at an arbitrary timing set by a user of the image forming apparatus 20.

In contrast, the user terminal 10 includes a transmission setting acquisition unit 111, a transmission setting display unit 112, a transmission setting changing unit 113, a transmission setting transmission unit 114 and the like. The above-described units are enabled by processes that one or more programs installed in the user terminal 10 cause the CPU 104 to execute.

The transmission setting acquisition unit 111 acquires a transmission setting which is a changing object or an editing object from any of the image forming apparatuses 20. The transmission setting display unit 112 displays a setting screen regarding the transmission setting acquired by the transmission setting acquisition unit 111 on the display device 106. The transmission setting changing unit 113 changes the transmission setting in response to an input of a changing instruction for transmission setting to the displayed setting screen. The transmission setting transmission unit 114 sends the changed transmission setting to the specified image forming apparatus 20. The image forming apparatus 20 of the transmission destination of the transmission setting is not necessarily the same as the image forming apparatus 20 of the acquisition destination for the transmission setting.

Figure 5:
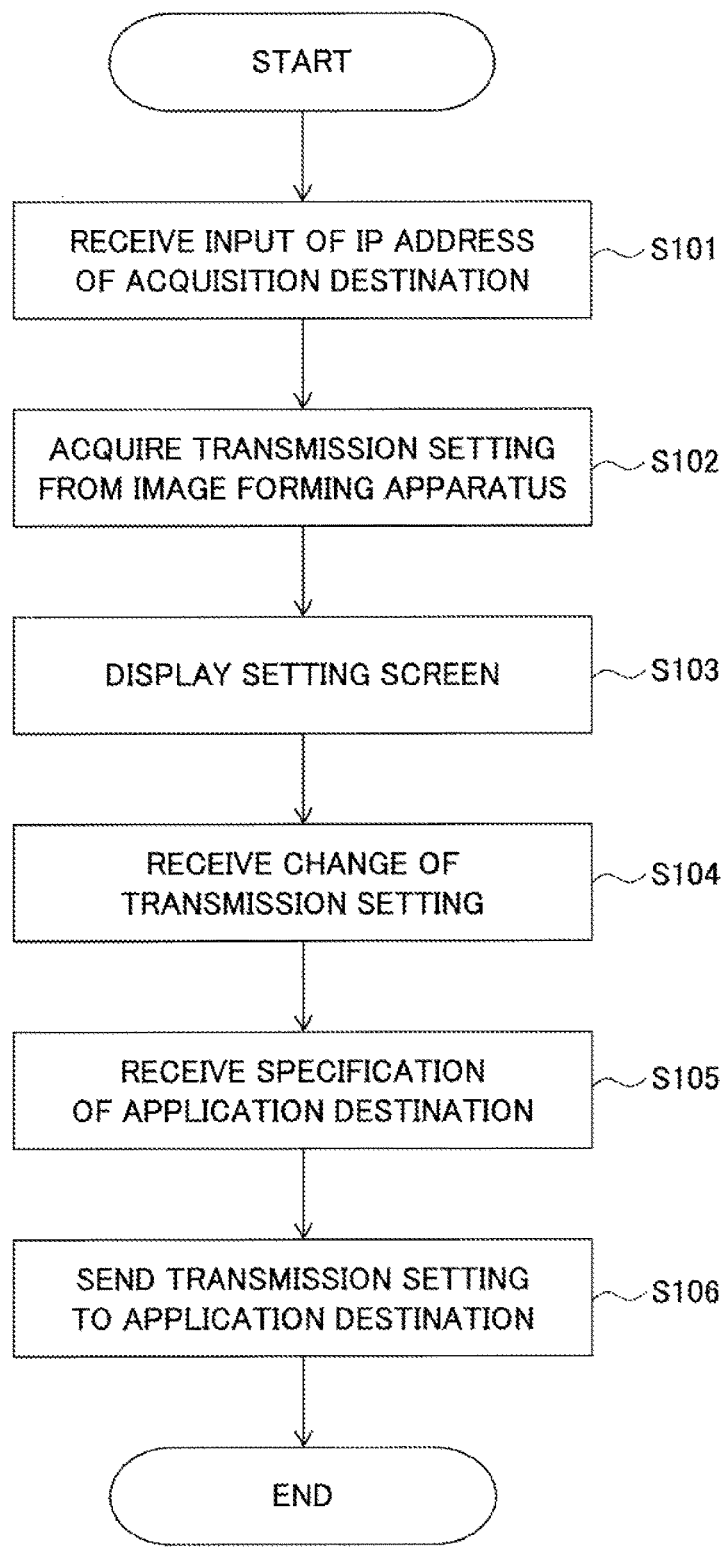
FIG. 5 is a flowchart for explaining an example of a processing procedure for the user terminal executing in the first embodiment.

In the following, a procedure of the processing carried out by the user terminal 10 will be described. FIG. 5 is a flowchart illustrating an example of the processing procedure carried out by the user terminal according to the first embodiment. Meanwhile, in the explanation of FIG. 5, a user operates the user terminal 10.

The transmission setting acquisition unit 111 accepts an input of an IP address of the image forming apparatus which is a transmission destination for the transmission setting (step S101). For example, the transmission setting acquisition unit 111 may display a screen for inputting an IP address, to accept the input of the IP address via the screen. Meanwhile, other than an IP address, another form of identification information, such as a Uniform Resource Locator (URL) may be input.

Subsequently, the transmission setting acquisition unit 111 acquires from an image forming apparatus 20 related to the input IP address, a transmission setting stored in the transmission setting storage unit 225 of the image forming apparatus 20 (step S102). In more detail, the transmission setting acquisition unit 111 sends an acquisition request for transmission setting to the image forming apparatus 20. The transmission setting readout unit 221 of the image forming apparatus 20, in response to the acquisition request, acquires the transmission setting stored in the transmission setting storage unit 225, and returns the acquired transmission setting to the transmission setting acquisition unit 111.

Figures 6, 7:
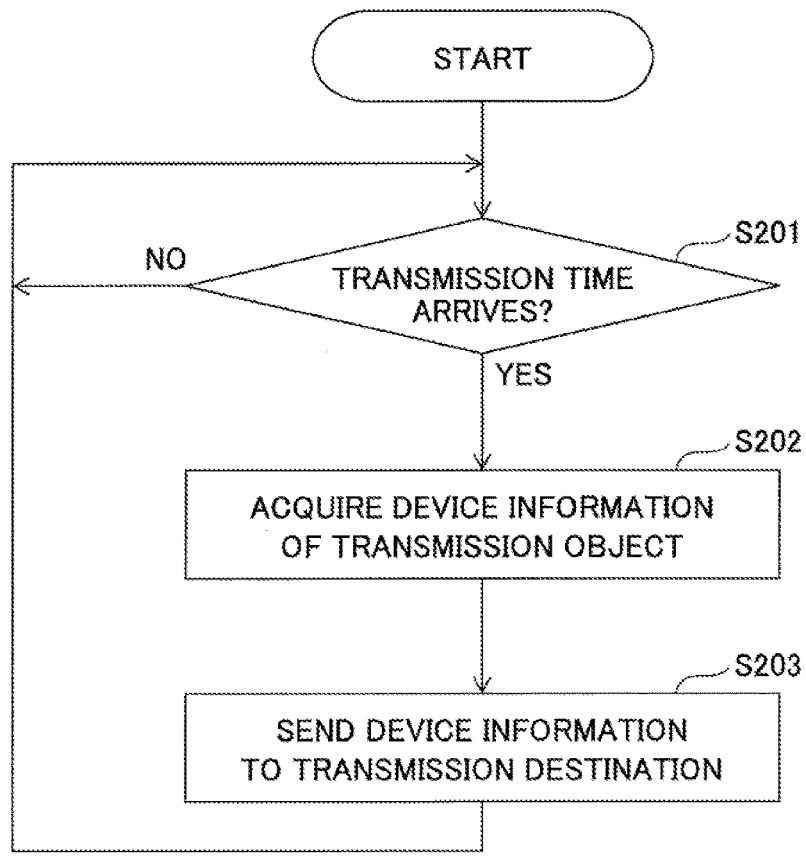
FIG. 6 is a diagram illustrating an example of a configuration of a transmission setting according to the first embodiment.
FIG. 7 is a flowchart for explaining an example of a processing procedure for sending device information according to the first embodiment.

FIG. 6 is a diagram illustrating an example of a configuration of the transmission setting. In FIG. 6, for the sake of convenience, the transmission setting is expressed in the form of a table. However, the transmission setting may be described by using the extensible markup language (XML) or the like.

In FIG. 6, the transmission setting includes setting items such as a transmission destination, a transmission time, a transmission retry, and a transmission object. Meanwhile, in FIG. 6, values of the respective setting items are exemplified. In a case where a transmission setting is not set in the image forming apparatus 20 of the transmission destination of transmission setting, values of the setting items are null in the transmission setting acquired in step S102, for example.

The transmission destination indicates identification information of a transmission destination of device information. For example, an e-mail address, a uniform resource locator (URL), or the like may be specified as a value of the transmission destination. In a case of the e-mail address, the value of the transmission destination may include a subject name of the e-mail. Identification information corresponding to another transmission protocol may be specifiable as the transmission destination. Moreover, a plurality of transmission destinations may be specifiable.

The transmission time is information indicating a time of transmitting device information. In a case of hoping to transmit device information periodically, e.g. at "h" o'clock every day, on "w" day every week, on the "d"-th every month, a cycle may be specified. Alternatively, a specific day and time may be specified. Or, a time, at which a value of any of items (parameters) of the device information becomes a specific value, may be specified as the transmission time. Furthermore, a combination of a plurality of transmission times may be specifiable.

The transmission retry is information indicating whether to carry out a retry of transmission of device information in a case where the transmission of device information is not successful. A value of the transmission retry is ON (retrying transmission) or OFF (not retrying transmission). A number of retries in a case where the value is ON may be specifiable.

The transmission object is an aggregate of names (parameter names) of items, which are objects to be transmitted, among the items of the device information. For example, in a case where counter information is the transmission object, a name of the counter, which is an object to be transmitted, is specified as the transmission object. Alternatively, in a case where items of the device information are grouped, a name of the group may be specified. For example, in a case where the counter information is grouped into counter information regarding charging, counter information for an administrator, counter information for respective users, eco counter information or the like, a transmission object may be specifiable in a unit of the group. Moreover, the group may be hierarchized.

Moreover, a plurality of kinds of transmission settings, each of which are set by the setting item group, as shown in FIG. 6, may be specifiable for an image forming apparatus 20. In this case, the kinds of transmission settings may be acquired in step S102. The respective transmission settings are different from each other in values of any of the setting items. By making the kinds of transmission settings specifiable for an image forming apparatus 20, for example, it becomes possible to send an item "A" of the device information to a mail address "a" on every Wednesday, and send an item "B" of the device information to htttp:xxx.yyy on the 10th every month.

Meanwhile, the transmission setting acquisition unit 111 stores the acquired transmission setting in, for example, the memory device 103.

Subsequently, the transmission setting display unit 112 displays, on the display device 106, a setting screen including the transmission setting stored in the memory device 103, in a changeable (editable) state (step S103). Subsequently, in a case where a change instruction is input for a value of any of the setting items in the transmission setting, via the setting screen, the transmission setting change unit 113 changes the value stored in the memory device 103 for the setting item regarding the change instruction (step S104). However, for a setting item for which the acquired value is null, a value is newly input.

Next, in a case of adding a new item regarding the transmission object, in order to make an addable item easily selectable, the transmission setting change unit 113 may refer to the image forming apparatus 20 for acquisition of the destination of transmission setting for item names of addable items, to display a list of item names of addable items as an option.

For example, in a case where an OK button on the setting screen is depressed, to instruct an end of the change (or input) of transmission setting by a user, the transmission setting transmission unit 114 accepts specification of an image forming apparatus 20 of an application destination of the transmission setting after the change stored in the memory device 103 from the user (step S105). For example, an input of an IP address of the image forming apparatus 20 of the application destination is accepted. The application destination may be a plurality of image forming apparatuses 20. That is, the same transmission setting may be applied to the plurality of image forming apparatuses 20. Moreover, the application destination may include or may not include the image forming apparatus 20 of the acquisition destination for the transmission setting.

Next, the transmission setting transmission unit 114 sends the transmission setting after the change to the respective image forming apparatuses 20 which are specified as the application destination (step S106). In a case of receiving the transmission setting, the transmission setting writing units 222 of the respective image forming apparatuses 20 store the transmission setting in the transmission setting storage units 225. On this occasion, a transmission setting already stored in the transmission setting storage unit 225 may be overwritten by the newly received transmission setting.

Next, transmission processing that the image forming apparatus 20 carries out based on the transmission setting will be described. FIG. 7 is a flowchart for explaining an example of the processing procedure of the transmission process for device information according to the first embodiment.

The device information transmission unit 223 refers values of respective transmission times of one or more transmission settings stored in the transmission setting storage unit 225, and determines whether a transmission time of device information regarding any of the transmission settings arrives, for example, periodically (step S201). In a case where the transmission time is specified to be a time at which a value of some item of the device information becomes a specific value, the device information transmission unit 223 refers the device information storage unit 226, to check the value of item.

The device information transmission unit 223, in a case of detecting arrival of a transmission time regarding any of the transmission settings (step S201: YES), acquires device information, which is the transmission object in the transmission setting, from the device information storage unit 226 (step S202). Subsequently, the device information transmission unit 223 sends the acquired device information to the transmission destination specified in the transmission setting (step S203).

As described above, according to the first embodiment, in a case of accepting a transmission setting regarding device information stored in an image forming apparatus 20, the image forming apparatus 20 sends the device information based on the transmission setting. The above-described transmission setting is applied to each of the image forming apparatuses 20, and thereby a user can collect the device information of the respective image forming apparatuses 20 at a desired transmission destination. As a result, it is possible to reduce the work burden for collecting the device information.

Moreover, according to the first embodiment, the user can apply a transmission setting to the plurality of image forming apparatuses 20 in a lump using the user terminal 10. Also from the above-described viewpoint, it is possible to reduce the work burden for collecting the device information.

In order to acquire counter information of each of the devices, it is necessary to access the respective devices. Therefore, especially, in an organization such as a company in which the plurality of devices are arranged, work burden for acquiring the counter information of the respective devices is not necessarily low.

Meanwhile, as a matter of convenience, the counter information is explained as an example. However, the above-described problem can be applied to information other than the counter information if it is individual information for each of the devices.

According to the embodiment of the present invention, it is possible to reduce the work burden for collecting information stored in devices.

Second Embodiment

Next, a second embodiment will be described. In the second embodiment, a difference from the first embodiment will be described. Therefore, a part that is not particularly mentioned may be considered to be the same as in the first embodiment.

Figure 8:
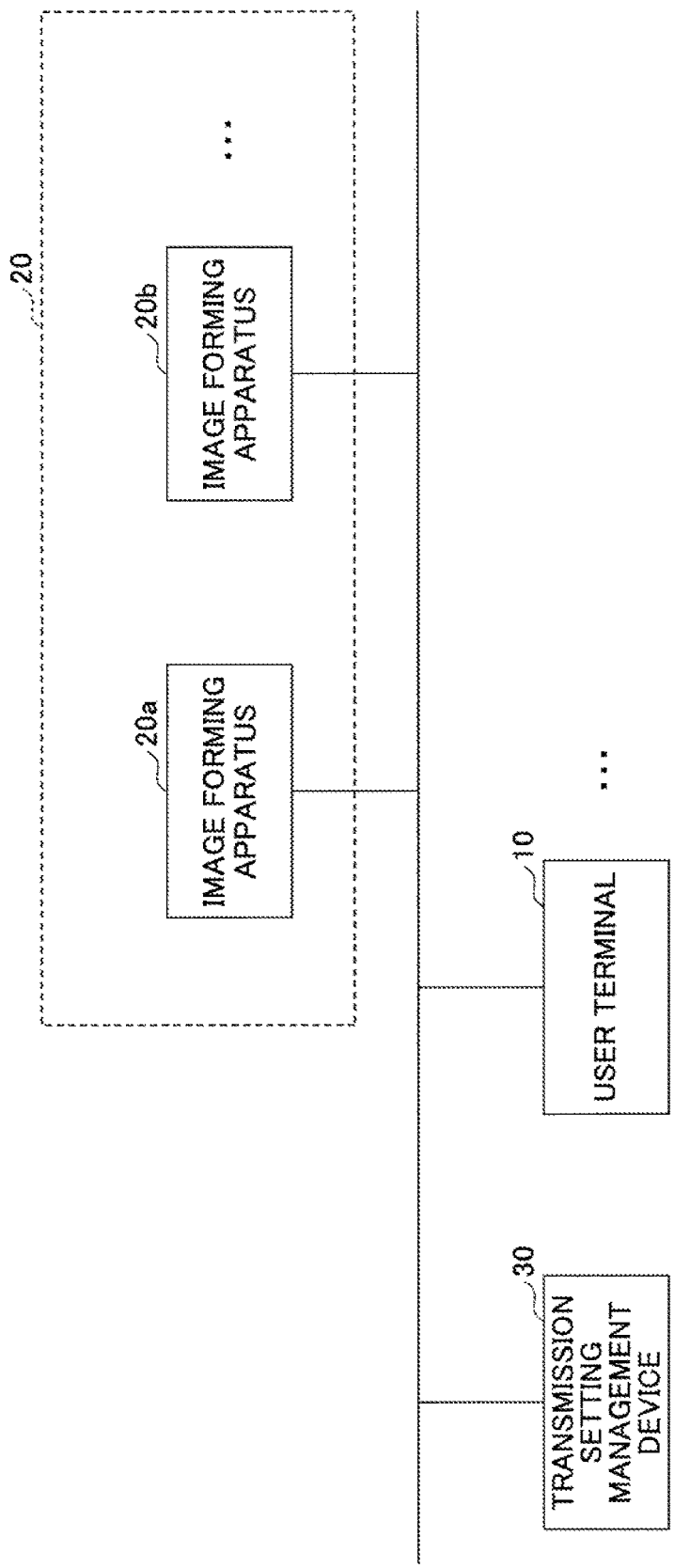
FIG. 8 is a diagram illustrating an example of a system configuration according to a second embodiment.

FIG. 8 is a diagram illustrating an example of a system configuration according to the second embodiment. In FIG. 8, the same reference numeral is assigned to the same part as in FIG. 1, and an explanation thereof will be omitted. In FIG. 8, a user terminal 10 and an image forming apparatus 20 are coupled to a transmission setting management device 30 via a LAN, the Internet, or the like. The transmission setting management device is one or more computers which store transmission settings in an integrated fashion. That is, in the second embodiment, the latest version of the transmission setting is stored in the transmission setting management device 30, not the respective image forming apparatuses 20.

Figure 9:
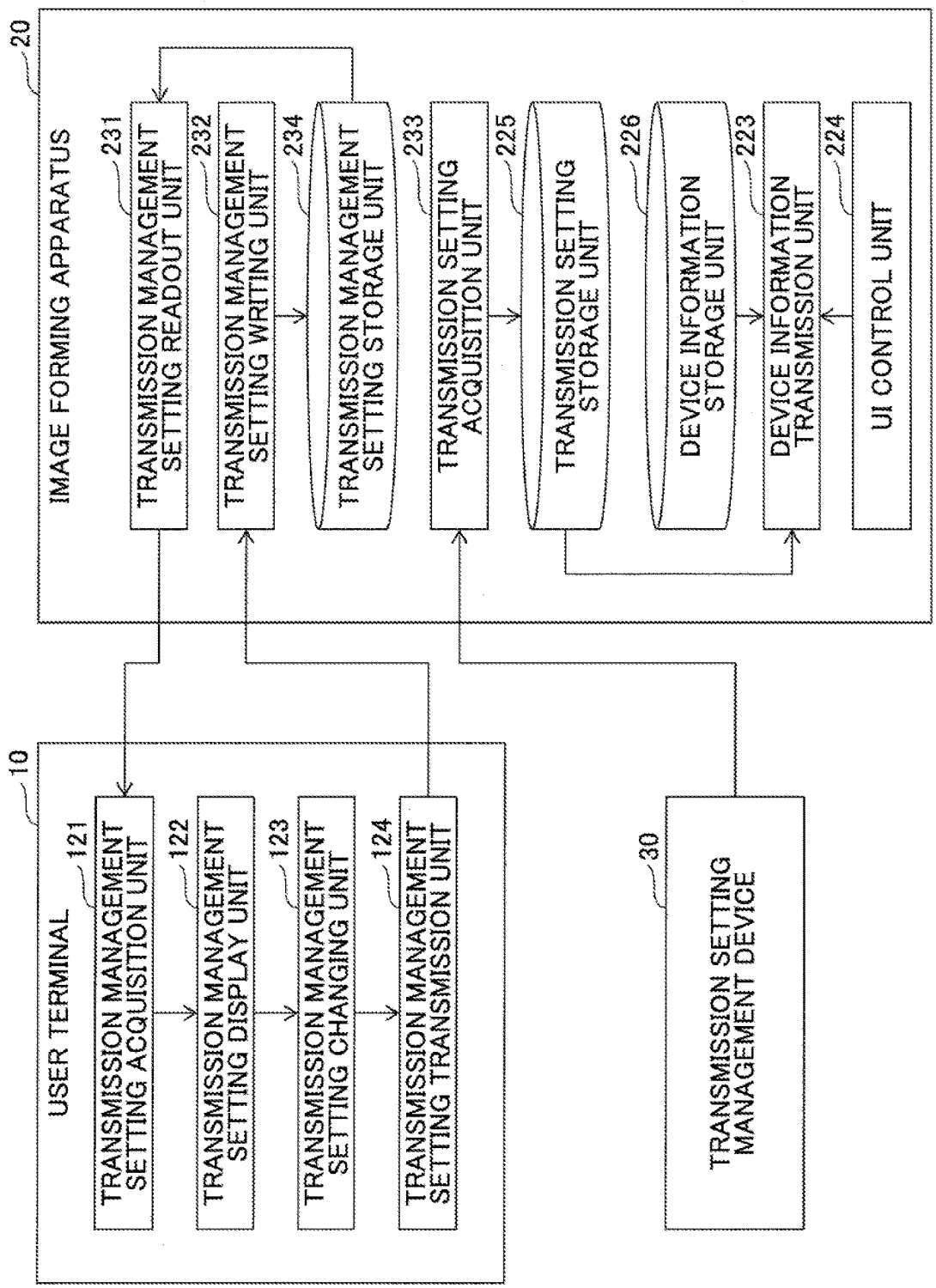
FIG. 9 is a diagram illustrating an example of a functional configuration of a user terminal and an image forming apparatus according to the second embodiment.

FIG. 9 is a diagram illustrating an example of a functional configuration of the user terminal 10 and the image forming apparatus 20 according to the second embodiment. In FIG.

9, the same reference numeral is assigned to the same part as in FIG. 4, and an explanation thereof will be omitted.

In FIG. 9, the image forming apparatus 20 further includes a transmission management setting readout unit 231, a transmission management setting writing unit 232, and a transmission setting acquisition unit 233. The respective above-described units are enabled by processes that one or more programs installed in the image forming apparatus 20 cause the CPU 211 to execute. Moreover, the image forming apparatus 20 further uses a transmission management setting storage unit 234. The transmission management setting storage unit 234 can be enabled by using, for example, the HDD 214, a storage device that can be coupled to the image forming apparatus 20 via the network, or the like.

The transmission management setting readout unit 231 reads out a transmission management setting stored in the transmission management setting storage unit 234 in response to a request from the user terminal 10, and sends the transmission management setting to the user terminal 10. The transmission management setting is setting information indicating identification information (e.g. address information, such as a URL or an IP address) of the transmission setting management device 30. The transmission management setting may include information indicating presence or absence of a retry in a case where a communication to the transmission management device 30 is not successful.

The transmission management setting writing unit 232 writes the transmission management setting sent from the user terminal 10 into the transmission management setting storage unit 234. The transmission setting acquisition unit 233 acquires a transmission setting from the transmission setting management device 30, which is specified based on the transmission management setting stored in the transmission management setting storage unit 234. The transmission setting acquisition unit 233 stores the acquired transmission setting in the transmission setting storage unit 225.

Meanwhile, in the second embodiment, the image forming apparatus 20 may not include the transmission setting readout unit 221 and the transmission setting writing unit 222.

In contrast, the user terminal 10 includes a transmission management setting acquisition unit 121, a transmission management setting display unit 122, a transmission management setting changing unit 123, a transmission management setting transmission unit 124 and the like. The respective above-described units are enabled by processes that one or more programs installed in the user terminal 10 cause the CPU 104 to execute.

The transmission management setting acquisition unit 121 acquires a transmission management setting which is a changing object or an editing object from any of the image forming apparatuses 20. The transmission management setting display unit 122 displays a setting screen regarding the transmission management setting acquired by the transmission management setting acquisition unit 121 on the display device 106. The transmission management setting changing unit 123 changes the transmission management setting in response to an input of a changing instruction for transmission management setting to the displayed setting screen. The transmission management setting transmission unit 124 sends the changed transmission management setting to the specified image forming apparatus 20. Meanwhile, in the second embodiment, the user terminal 10 may not include the transmission setting acquisition unit 111, the transmission setting display unit 112, the transmission setting changing unit 113, or the transmission setting transmission unit 114.

As is clear from the above, in the second embodiment, a transmission management setting is input or changed in the user terminal 10. In the second embodiment, a processing procedure carried out by the user terminal 10 may be obtained by replacing "transmission setting" with "transmission management setting" in FIG. 5.

Figure 10:
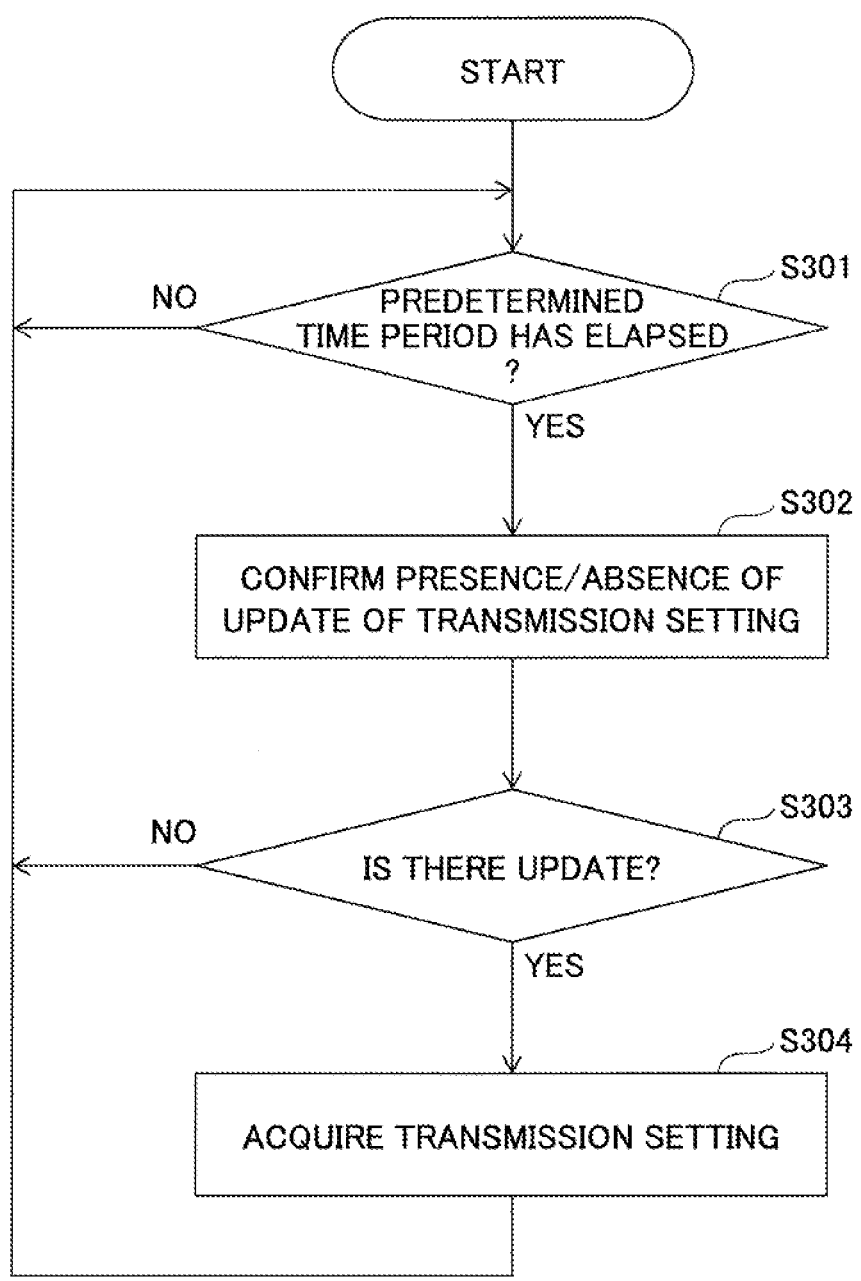
FIG. 10 is a flowchart for explaining an example of a processing procedure for the image forming apparatus executing in the second embodiment.

In contrast, the image forming apparatus 20 according to the second embodiment carries out a processing procedure shown in FIG. 10. FIG. 10 is a flowchart for explaining an example of the processing procedure that the image forming apparatus according to the second embodiment carries out.

The transmission setting acquisition unit 233 carries out the process of step S302 or later periodically, for example (step S301). The transmission setting acquisition unit 233 accesses the transmission setting management device 30 and confirms whether the transmission setting is updated (step S302). For example, the transmission setting management device 30 stores version information of a transmission setting along with the transmission setting. The version information represents a value which is changed in a case where at least a part of the transmission setting is updated. A date and time at which at least a part of the transmission setting is finally updated (latest updated date) may be used as the version information. The transmission setting acquisition unit 233 compares version information of a transmission setting stored in the transmission setting storage unit 225 with the version information of the transmission setting stored in the transmission setting management device 30, and determines whether the transmission setting in the transmission setting management device 30 is updated (step S303).

In a case where the version information of the transmission setting storage unit 225 and the version information the transmission setting management device 30 are different from each other, i.e. the transmission setting in the transmission setting management device 30 has been updated (step S303: YES), the transmission setting acquisition unit 233 acquires the transmission setting and the version information stored in the transmission setting management device 30, and stores the transmission setting and the version information into the transmission setting storage unit 255 (step S304).

Meanwhile, the transmission setting management device 30 may be a Web server. In this case, for example, a user may change the transmission setting stored in the transmission setting management device 30, by using a Web browser of the user terminal 10.

As described above, according to the second embodiment, by changing the transmission setting, which is managed in an integrated fashion, the transmission setting after changing can be easily applied to the plurality of image forming apparatuses 20.

Meanwhile, the above-described embodiments may be applied to a device other than the image forming apparatus 20. For example, the embodiments may be applied to a projector, a video conference system, a digital camera or the like.

Meanwhile, in the respective above-described embodiment, the user terminal 10 and the transmission setting management device 30 are examples of an information processing device. The image forming apparatus 20 is an example of a device. The transmission setting writing unit 222 and the transmission setting acquisition unit 233 are examples of a reception unit. The device information transmission unit 223 is an example of a first transmission unit. The transmission setting changing unit 113 is an example of an acceptance unit. The transmission setting transmission unit 114 is an example of a second transmission unit. The transmission setting storage unit 225 is an example of a storage unit. The transmission setting acquisition unit 111 is an example of an acquisition unit.

Further, the present invention is not limited to these embodiments, but various variations and modifications may be made without departing from the scope of the present invention.

What is claimed is:

1. An information processing apparatus comprising:
   a network interface configured to connect to plural image forming apparatuses via a network, each image forming apparatus registering (i) counter information relating to execution of a job that uses a printer or scanner included in the image forming apparatus and (ii) transmission setting information including a specified transmission destination and a specified transmission time and relating to transmitting the counter information to a destination device;
   a user interface including a display device;
   a processor configured to:
      obtain, from an image forming apparatus amongst the plural image forming apparatuses via the network, the transmission setting information registered by the image forming apparatus;
      edit the transmission setting information obtained from the image forming apparatus based on a change request, in response to receiving the change request via the user interface from a user;
      transmit the edited transmission setting information to the plural image forming apparatuses so as to cause each of the plural image forming apparatuses to transmit the counter information to the destination device based on the transmission destination and the transmission time included in the edited transmission setting information;
      accept an input from a user; and
      transmit the transmission setting information based on the accepted input, to the image forming apparatus,
   wherein the image forming apparatus includes a storage device configured to store the transmission setting information, and the transmission setting information stored in the storage device is updated by additional transmission setting information received by the image forming apparatus, and
   wherein the processor of the information processing apparatus is further configured to acquire the transmission setting information stored in the storage device, and accept from the user a change to the acquired transmission setting information.

2. The information processing apparatus according to claim 1, wherein the transmission setting information transmitted by the information processing apparatus to the plural image processing apparatuses specifies the information to be transmitted among information stored in the image forming apparatus, and
   wherein the image forming apparatus is caused by the information processing apparatus to transmit the information specified among the information stored in the image forming apparatus based on the transmission setting information received by a reception unit included in the image forming apparatus.

3. The information processing apparatus according to claim 1, wherein a value of information stored in the image forming apparatus varies according to an operation of the image forming apparatus.

4. The information processing apparatus according to claim 1, wherein the processor is further configured to transmit the transmission setting information based on the accepted input from the user, to another image forming apparatus, which is different from the image forming apparatus from which the transmission setting information is acquired.

5. The information processing apparatus according to claim 1, wherein the processor is further configured to:
   input a network address of an image forming apparatus amongst the plural image forming apparatus from which the transmission setting information is to be obtained; and
   edit the transmission setting information obtained from the image forming apparatus which corresponds to the identifier, the obtained transmission setting information including a job counter value of the image forming apparatus,
   wherein the edited transmission setting information setting transmitted to each of the plural image forming apparatuses is the same.

6. An information processing method performed by an information processing apparatus comprising a user interface including a display device and which is connected to plural image forming apparatuses, each image forming apparatus registering (i) counter information relating to execution of a job that uses a printer or scanner included in the image forming apparatus and (ii) transmission setting information including a transmission destination and a transmission time and relating to transmitting the counter information to a destination device, the information processing method comprising:
   obtaining, from an image forming apparatus amongst the plural image forming apparatus via the network, the transmission setting information registered by the image forming apparatus;
   editing the transmission setting information obtained from the image forming apparatus based on a change request, in response to receiving the change request via the user interface from a user;
   transmitting the edited transmission setting information to the plural image forming apparatuses so as to cause each of the plural image forming apparatuses to transmit the counter information to the destination device based on the transmission destination and the transmission time included in the edited transmission setting information;
   accepting, in the information processing apparatus, an input from a user;
   transmitting, in the information processing apparatus, the transmission setting information based on the accepted input to the image forming apparatus;
   storing, in the image forming apparatus, the transmission setting information in a storage unit included in the image forming apparatus;
   updating, in the image forming apparatus, the transmission setting information stored in the storage unit by additional transmission setting information received from the information processing apparatus;
   acquiring, in the information processing apparatus, the transmission setting information stored in the storage unit; and accepting, in the information processing apparatus, a change to the acquired transmission setting information from the user.

7. The information processing method according to claim 6,
wherein the transmission setting information transmitted by the information processing apparatus to the plural image processing apparatuses specifies the information to be transmitted among information stored in the image forming apparatus, and
wherein the information specified among the pieces of information stored in the image forming apparatus by the transmission setting information received from the information processing apparatus is transmitted.

8. The information processing method according to claim 6,
wherein a value of information stored in the image forming apparatus varies according to an operation of the image forming apparatus.

9. The information processing method according to claim 6 further comprising:
transmitting, in the image forming apparatus, the transmission setting information based on the input accepted from the user to another image forming apparatus, which is different from the image forming apparatus from which the transmission setting information is acquired.

10. An information processing system, comprising:
plural image forming apparatuses;
an information processing apparatus comprising:
a network interface configured to connect the information processing apparatus to the plural image forming apparatuses, each image forming apparatus registering (i) counter information relating to execution of a job that uses a printer or scanner included in the image forming apparatus and (ii) transmission setting information including a transmission destination and a transmission time and relating to transmitting the counter information to a destination device;
a user interface including a display device;
a processor configured to:
obtain, from an image forming apparatus amongst the plural image forming apparatus via the network, the transmission setting information registered by the image forming apparatus;
edit the transmission setting information obtained from the image forming apparatus based on a change request, in response to receiving the change request via the user interface from a user;
transmit the edited transmission setting information to the plural image forming apparatuses so as to cause each of the plural image forming apparatuses to transmit the counter information to the destination device based on the transmission destination and the transmission time included in the edited transmission setting information;
accept an input from a user;
transmit the transmission setting information based on the accepted input, to the image forming apparatus;
cause the transmission setting information to be stored in a storage device included in the image forming apparatus;
cause the transmission setting information stored in the storage device to be updated by additional transmission setting information received from the information processing apparatus,
acquire the transmission setting information stored in the storage device, and
accept a change to the acquired transmission setting information from the user.

11. The information processing system according to claim 10,
wherein the transmission setting information specifies information to be transmitted among the pieces of information stored in the image forming apparatus, and
wherein the information specified among the pieces of information stored in the image forming apparatus by the transmission setting information received from the information processing apparatus is transmitted.

12. The information processing system according to claim 10, wherein a value of information stored in the image forming apparatus varies according to an operation of the image forming apparatus.

13. The information processing system according to claim 10, wherein
the image forming apparatus transmits the transmission setting information based on the input accepted from the user to another image forming apparatus, which is different from the image forming apparatus from which the transmission setting information is acquired.

14. The information processing system according to claim 10, wherein the image forming apparatus includes a processor to receive an instruction for transmitting the information, and to cause the processor to transmit the information in accordance with the received instruction.

* * * * *

UNITED STATES PATENT AND TRADEMARK OFFICE
CERTIFICATE OF CORRECTION

PATENT NO. : 9,894,221 B2
APPLICATION NO. : 15/049362
DATED : February 13, 2018
INVENTOR(S) : Kaori Kato Page 1 of 1

It is certified that error appears in the above-identified patent and that said Letters Patent is hereby corrected as shown below:

On the Title Page

Replace item (54), with the following:

-- (54) INFORMATION PROCESSING SYSTEM, INFORMATION PROCESSING APPARATUS, DEVICE, INFORMATION PROCESSING METHOD AND COMPUTER PROGRAM PRODUCT, CONFIGURED FOR PROCESSING OF TRANSMISSION AT TIME SPECIFIED IN TRANSMISSION SETTING INFORMATION --.

In the Specification

Replace title at Column 1, Lines 1-8, with the following:

-- INFORMATION PROCESSING SYSTEM, INFORMATION PROCESSING APPARATUS, DEVICE, INFORMATION PROCESSING METHOD AND COMPUTER PROGRAM PRODUCT, CONFIGURED FOR PROCESSING OF TRANSMISSION AT TIME SPECIFIED IN TRANSMISSION SETTING INFORMATION --.

Signed and Sealed this
Eighth Day of May, 2018

Andrei Iancu
*Director of the United States Patent and Trademark Office*